United States Patent
Said et al.

(10) Patent No.: US 10,425,649 B2
(45) Date of Patent: Sep. 24, 2019

(54) METHOD AND APPARATUS FOR PERFORMING GRAPH-BASED PREDICTION USING OPTIMIZATION FUNCTION

(71) Applicant: LG ELECTRONICS INC., Seoul (KR)

(72) Inventors: Amir Said, San Jose, CA (US); Yung-Hsuan Chao, San Jose, CA (US); Hilmi Enes Egilmez, San Jose, CA (US)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 15/520,968

(22) PCT Filed: Oct. 21, 2015

(86) PCT No.: PCT/KR2015/011137
§ 371 (c)(1),
(2) Date: Apr. 21, 2017

(87) PCT Pub. No.: WO2016/064185
PCT Pub. Date: Apr. 28, 2016

(65) Prior Publication Data
US 2017/0359584 A1 Dec. 14, 2017

Related U.S. Application Data

(60) Provisional application No. 62/066,365, filed on Oct. 21, 2014.

(51) Int. Cl.
*H04N 19/19* (2014.01)
*H04N 19/159* (2014.01)
(Continued)

(52) U.S. Cl.
CPC ............. *H04N 19/159* (2014.11); *A45C 11/00* (2013.01); *A45C 13/1069* (2013.01); *A45F 5/00* (2013.01);
(Continued)

(58) Field of Classification Search
CPC .. H04N 19/159; H04N 19/103; H04N 19/105; H04N 19/136; H04N 19/18;
(Continued)

(56) References Cited

U.S. PATENT DOCUMENTS

2011/0206288 A1 8/2011 Lee
2013/0272422 A1 10/2013 Lee

FOREIGN PATENT DOCUMENTS

EP 2360927 A2 * 8/2011 ........... H04N 19/597
EP 2360927 A2 8/2011
(Continued)

OTHER PUBLICATIONS

G. Shen, W.-S. Kim, S.K. Narang, A. Ortega, Jaejoon Lee, HoCheon Wey, "Edge-Adaptive Transforms for Efficient Depth Map Coding", 28th Picture Coding Symposium, PCS2010, Dec. 8-10, 2010, Nagoya, Japan (Year: 2010).*
(Continued)

*Primary Examiner* — Ayman A Abaza
(74) *Attorney, Agent, or Firm* — Fish & Richardson P.C.

(57) ABSTRACT

Performing a graph-based prediction using a graph signal can be performed using a method that includes obtaining a context signal; generating a graph signal based on a graph parameter set; obtaining a graph-based transform matrix based on the graph signal, wherein the graph-based transform matrix includes an eigenvector; obtaining a prediction vector using an optimal transform vector calculated through an optimization function; and generating a prediction signal using the prediction vector, where the optimization function
(Continued)

has the context signal, an eigenvalue of a graph Laplacian matrix and the eigenvector as a variable. Accordingly, a prediction value may be obtained with reduced complexity and the prediction performance may be improved.

10 Claims, 9 Drawing Sheets

(51) Int. Cl.
```
A45F 5/00        (2006.01)
A45C 11/00       (2006.01)
A45C 13/10       (2006.01)
H04N 19/105      (2014.01)
H04N 19/18       (2014.01)
H04N 19/44       (2014.01)
H04N 19/503      (2014.01)
H04N 19/61       (2014.01)
H04N 19/50       (2014.01)
H04N 19/103      (2014.01)
H04N 19/136      (2014.01)
```
(52) U.S. Cl.
CPC ......... *H04N 19/103* (2014.11); *H04N 19/105* (2014.11); *H04N 19/136* (2014.11); *H04N 19/18* (2014.11); *H04N 19/19* (2014.11); *H04N 19/44* (2014.11); *H04N 19/50* (2014.11); *H04N 19/503* (2014.11); *H04N 19/61* (2014.11); *A45C 2011/002* (2013.01); *A45F 2005/008* (2013.01); *A45F 2200/0516* (2013.01)

(58) Field of Classification Search
CPC ........ H04N 19/19; H04N 19/44; H04N 19/50; H04N 19/503; H04N 19/61; A45C 11/00; A45C 13/1069; A45C 2011/002; A45F 5/00; A45F 2005/008; A45F 2200/0516
USPC ...................................... 375/240.02
See application file for complete search history.

(56) References Cited

FOREIGN PATENT DOCUMENTS

| JP | 2014007477 A | 1/2014 |
|---|---|---|
| KR | 10-2011-0093532 | 8/2011 |
| KR | 10-2011-0135787 | 12/2011 |
| KR | 10-2014-0116194 | 10/2014 |

OTHER PUBLICATIONS

Gagan B. Rath and Anamitra Makur, "Iterative Least Squares and Compression Based Estimations for a Four-Parameter Linear Global Motion Model and Global Motion Compensation", IEEE Transactions on Circuits and Systems for Video Technology, vol. 9, No. 7, October 1999 (Year: 1999).*

D. K. Hammond, P. Vandergheynst, and R. Gribonval, "Wavelets on graphs via spectral graph theory," Tech. Rep. Dec. 2009. (Year: 2009).*

Extended European Search Report in European Application No. 15853353.9, dated Apr. 3, 2018, 10 pages.

Martinez-Enriquez et al., "Video Encoder Based on Lifting Transforms on Graphs," Image Processing (ICIP), 2011 18th IEEE International Conference on, IEEE, Sep. 11, 2011, pp. 3509-3512, XP032080453.

Rath et al., "Iterative Least Squares and Compression Based Estimations for a Four-Parameter Linear Global Motion Model and Global Motion Compensation," IEEE Transactions on Circuits and Systems for Video Technology, Institute of Electrical and Electronics Enginerrs, USA, vol. 9, No. 7, Oct. 1, 1999, pp. 1075-1099, XP000904556.

Zhang et al., "Analyzing the Optimality of Predictive Transform Coding Using Graph-Based Models," IEEE Signal Processing Letters, vol. 20, No. 1, Jan. 1, 2013, pp. 106-109, XP011476604.

Kim et al., "Graph Based Transforms for Depth Video Coding," 2012 IEEE International Conference on Acoustics, Speech and Signal Processing (ICASSP 2012), Mar. 25, 2012, pp. 813-816, XP032227251.

Shen et al., "Edge-Adaptive Transforms for Efficient Depth Map Coding," 28th Picture Coding Symposium, PCS2010 Dec. 8-10, 2010, pp. 566-569.

Zhang et al., "Analyzing the Optimality of Predictive Transform Coding Using Graph-Based Models," IEEE Signal Processing Letters, Jan. 2013, 20(1):106-109.

Shuman et al., "The emerging field of signal processing on graphs: Extending high-dimensional data analysis to networks and other irregular domains," IEEE Signal Processing Magazine, May 2013, 30(3):83-98.

International Search Report in International Application No. PCT/KR2015/011137, dated Feb. 4, 2016, 8 pages.

* cited by examiner

METHOD AND APPARATUS FOR PERFORMING GRAPH-BASED PREDICTION USING OPTIMIZATION FUNCTION

CROSS-REFERENCE TO RELATED APPLICATIONS

This application is the National Stage filing under 35 U.S.C. 371 of International Application No. PCT/KR2015/011137, filed on Oct. 21, 2015, which claims the benefit of U.S. Provisional Applications No. 62/066,365, filed on Oct. 21, 2014, the contents of which are all hereby incorporated by reference herein in their entirety.

TECHNICAL FIELD

The present invention relates to a graph-based signal processing method and apparatus, and more particularly, to a method and apparatus for processing a signal for performing a graph-based prediction using an optimization function.

BACKGROUND ART

Most of the traditional discrete-time signal processing techniques have evolved directly from processing and filtering analog signals, and thus have been constrained by several common assumptions, like sampling and processing only regularly organized data. The field of video compression is based on basically the same assumptions, but only generalized to multi-dimensional signals.

A graph is a useful type of data representation for describing a geometrical structure of data in various application fields. Signal processing based on graph representations can generalize concepts like sampling, filtering, Fourier transforms, etc., using graphs where each signal sample represents a vertex, and signal relationships are represented by graph edges with positive weights. This disconnects the signal from its acquisition process, so that properties like sampling rate and sequences can be replaced by the properties of graph. In fact, the traditional representations now become simply special cases, defined by some specific graph models.

DISCLOSURE

Technical Problem

All video coding standards include a signal prediction as one of the basic elements, and the compression efficiency is strongly influenced by the accuracy and the reliability of a prediction method. There are many theoretical tools for the signal prediction based on a statistical model of a signal. However, many practical problems occur when applying the tools to complex signals such as an audio, an image and a video. For example, it is very hard to predict a reliable model parameter. This is because the model parameters may be significantly changed with respect to different sources, even the same source. An important point is that the use of the prediction is basic in the compression, which is an important difference from other applications. However, there is a problem that many prediction methods actually used for compressing a signal are based on experimental statistics.

In addition, new graph models have been proposed for the signal process and the compression. The new graph models enable a part of local signal properties such as an edge and discontinuity to be modeled in simpler and more proper manner compared with what is provided by general statistical numerals. For example, the spectrum resolution the Laplacian matrix of the graph is provided in the form of Fourier analysis proper to the signal for the graph model.

Accordingly, the present invention is to provide a method for finding a better predictor with low complexity when a graph for modeling a statistical relation between variables is provided.

Technical Solution

The present invention provides a method for performing a graph-based prediction using an optimization function.

In addition, the present invention provides a method for defining an optimized prediction algorithm based on a cost function based on a distribution of eigenvalues of the graph Laplacian and a linear combination of eigenvectors.

In addition, the present invention provides a method for finding a prediction value using convex optimization formulation and a method for utilizing graph characteristics.

Technical Effects

The graph-based signal modeling to which the present invention is applied may be a powerful tool. Particularly, the present invention provides an optimized prediction algorithm for performing a graph-based prediction using an optimization function, and accordingly, a prediction value may be obtained with low complexity. Furthermore, the prediction performance may be improved.

In addition, the present invention is applicable to an arbitrary graph signal as well as a graph signal of a regular structure, and accordingly, an excessive overhead of bit rate required for encoding a graph signal may be avoided.

In addition, the present invention adaptively utilizes the statistical characteristics of a signal for other parts of a video sequence, thereby an compression efficiency being improved.

BEST MODE FOR INVENTION

Figure 1:
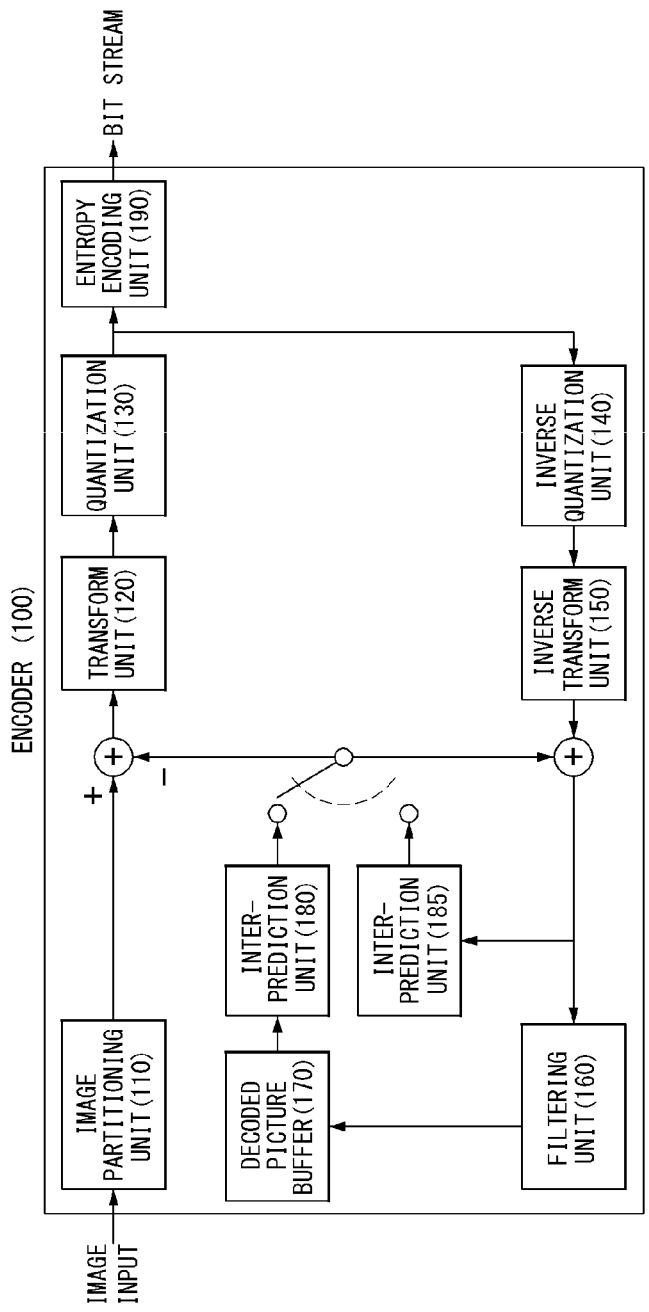
FIG. 1 illustrates a schematic block diagram of an encoder in which an encoding of a video signal is performed.

The present invention provides a method for performing a graph-based prediction using a graph signal including obtaining a context signal; generating a graph signal based on a graph parameter set; obtaining a graph-based transform matrix based on the graph signal, wherein the graph-based transform matrix includes an eigenvector; obtaining a prediction vector using an optimal transform vector calculated through an optimization function; and generating a prediction signal using the prediction vector, where the optimization function has the context signal, an eigenvalue of a graph Laplacian matrix and the eigenvector as a variable.

In addition, in the present invention, the prediction vector is obtained based on a linear combination of the transform vector and the eigenvector, and the transform vector is determined using a cost function based on a distribution of the eigenvalue of the graph Laplacian matrix.

In addition, the present invention further includes calculating the graph Laplacian matrix based on the graph signal, and the graph-based transform matrix is obtained through a spectral decomposition of the graph Laplacian matrix.

In addition, in the present invention, the optimization function is represented as an unconstrained optimization function based on a Lagrange multiplier, and the unconstrained optimization function is represented by a new M-dimensional vector.

In addition, the present invention further includes encoding a prediction error; and transmitting the encoded prediction error.

In addition, the present invention provides a method for decoding a video signal based on a graph-based prediction including receiving the video signal including a graph parameter set and a residual signal; obtaining a graph-based transform matrix including an eigenvector based on the graph parameter set; obtaining a prediction vector using an optimal transform vector calculated through an optimization function; generating a prediction signal using the prediction vector; and reconstructing the video signal by adding up the prediction signal and the residual signal, where the optimization function has a context signal, an eigenvalue of a graph Laplacian matrix and the eigenvector as a variable.

In addition, the present invention provides an apparatus for performing a graph-based prediction using a graph signal including a graph-based transform unit for generating a graph signal based on a graph parameter set and obtaining a graph-based transform matrix including an eigenvector based on the graph signal; and a prediction unit for obtaining a context signal, obtaining a prediction vector using an optimal transform vector calculated through an optimization function and generating a prediction signal using the prediction vector, where the optimization function has the context signal, an eigenvalue of a graph Laplacian matrix and the eigenvector as a variable.

In addition, in the present invention, the graph-based transform unit calculates the graph Laplacian matrix based on the graph signal, wherein the graph-based transform matrix is obtained through a spectral decomposition of the graph Laplacian matrix.

In addition, the present invention further includes an entropy encoding unit for encoding a prediction error and transmitting the encoded prediction error.

In addition, the present invention provides an apparatus for decoding a video signal based on a graph-based prediction including an entropy decoding unit for receiving the video signal including a graph parameter set and a residual signal; an inverse transform unit for obtaining a graph-based transform matrix including an eigenvector based on the graph parameter set; a prediction unit for obtaining a prediction vector using an optimal transform vector calculated through an optimization function and generating a prediction signal using the prediction vector; and a reconstruction unit for reconstructing the video signal by adding up the prediction signal and the residual signal, where the optimization function has a context signal, an eigenvalue of a graph Laplacian matrix and the eigenvector as a variable.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, embodiments proposed in this specification is directed to video signal processing, but the present invention should not be construed as being based on only video signal processing, and will be applicable to a method of processing general graph-based signal.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

Actually, there is not accurate statistical model for very complex and various signals like a video. Accordingly, the present specification is based on the assumption that the probability distribution f(x/y) or f(x,y) that forms a statistical model is already known.

The statistical property of a video signal is significantly changed depending on a video type or in each frame. Thus, even in the case of utilizing a simple statistical model or an automatic learning, the present invention has a difficulty in measuring reliably the model parameters that are continually changed. In addition, when a model is too simple or the parameters are unable to reflect the actual property of a signal, the prediction may be inaccurate. Actually, the prediction accuracy becomes decreased as the model complexity increases.

Accordingly, the present invention requires more powerful approach to improve the prediction performance.

Another important issue in relation to the prediction applied to a compression is that an encoder may access to all data to be encoded, different from the conventional statistical approach. Since an encoder may transmit side information that enables a prediction of a decoder to be improved, it may cause a very significant change. For example, an encoder may encode a model type which is utilized and the side information for the parameter.

Currently, the prediction methods utilized for a video coding method is mostly dependent on an encoding of side information, and utilizes very trivial assumption for a statistical model, for example, a pixel copying, a simple interpolation, and the like. Furthermore, geometrical models are used for expressing video properties such as an edge, instead of using the conventional statistical distribution.

For example, a video coding standard utilizes only a simple interpolation for an intra-frame prediction which is a selected pixel distribution model or selected among predetermined pixel values according to 33 directional set. And, the inter-frame prediction assumes a motion model between frames and utilizes the interpolation for a minor pixel motion.

The major problem in such an approach is that the geometrical model is very limited and the current video coding standard adequately utilizes the characteristics such as a straight line edge and a motion change.

Meanwhile, the graph signal processing is a new approach that generalizes the most fundamental techniques that have been used for processing signal. The graph signal processing generalizes the empirical technique based on the geometrical characteristics that enables a powerful integration of the image properties during a prediction procedure. The graph signal processing may be combined with a statistical analysis, but is not required to induce a perfect statistical model.

It is apparent that a method for selecting a proper graph edge weighted value is an essential part in the all types of graph signal processing. However, this will not be described in detail in the present specification since it is not directly related to the present invention. Hereinafter, an optimization prediction method will be described, which solves the problem of the statistical mode, the geometrical model and the graph model described above.

FIG. 1 illustrates a schematic block diagram of an encoder in which an encoding of a video signal is performed.

Referring to FIG. 1, an encoder 100 may include an image partitioning unit 110, a transform unit 120, a quantization unit 130, an inverse quantization unit 140, an inverse transform unit 150, a filtering unit 160, a decoded picture buffer (DPB) 170, an inter-prediction unit 180, an intra-prediction unit 185 and an entropy encoding unit 190.

The image partitioning unit 110 partitions an input image (or a picture frame) inputted to the encoder 100 into one or more process units. For example, the process unit may be a coding tree unit (CTU), a coding unit (CU), a prediction unit (PU) or a transform unit (TU).

However, the terms are used only for the convenience of description for the present invention, but the present invention is not limited to the definition of the corresponding term. In addition, the convenience of description, in the present invention, the term of coding unit is used as a unit used in the process of encoding or decoding a video signal, but the present invention is not limited thereto, and may be interpreted properly according to the contents of the invention.

The encoder 100 may generate a residual signal by subtracting the prediction signal outputted from the inter-prediction unit 180 and the intra-prediction unit 185 in the input image signal, and the generated residual signal is transmitted to the transform unit 120.

The transform unit 120 may generate a transform coefficient by applying a transform technique to the residual signal. The transform process may be applied to a pixel block that has the same size as a square, or may also be applied to a block of variable size.

As an embodiment of the present invention, the transform unit 120 may obtain a graph signal using a graph parameter.

As another embodiment of the present invention, the transform unit 120 may obtain a graph signal using at least one of a vertex parameter set and an edge parameter set.

As another embodiment of the present invention, the transform unit 120 may obtain an optimized graph-based transform kernel based on an optimization function. In this case, the optimization function may be represented as an unconstrained optimization function using a Lagrange multiplier, and the unconstrained optimization function may be represented by a new M-dimensional vector.

As another embodiment of the present invention, the transform unit 120 may obtain a prediction vector using an optimal transform vector calculated through the optimization function, and the prediction vector may be used for generating a prediction signal. In this case, the prediction vector may be obtained based on a linear combination between an eigenvector of a matrix and a cost function based on a distribution of the eigenvector.

The quantization unit 130 may quantize a transform coefficient and transmit it to the encoding unit 190. The entropy encoding unit 190 may perform entropy coding of the quantized signal and output it as a bit stream.

The quantized signal outputted from the quantization unit 130 may be used for generating a prediction signal. For example, the quantized signal may reconstruct the residual signal by applying an inverse quantization and an inverse transformation through the inverse quantization unit 140 and the inverse transform unit 150 in a loop. By adding the reconstructed residual signal to the prediction signal outputted from the inter-prediction unit 180 or the intra-prediction unit 185, a reconstructed signal may be generated.

Meanwhile, in the compression process, neighboring blocks are quantized by different quantization parameters, and thus, an artifact that the block boundary is shown may occur. The phenomenon is called blocking artifacts, which is one of major factors for evaluating an image quality. In order to decrease the artifacts, a filtering process may be performed. Through the filtering process, the blocking artifacts may be removed and at the same time, an error for the current picture is decreased, thereby image quality being improved.

The filtering unit 160 applies filtering to the reconstructed signal and outputs the filtered signal to a playback device or transmits the filtered signal to the DPB 170. The filtered signal transmitted to the DPB 170 may be used as a reference picture in the inter-prediction unit 180. As such, both picture quality and encoding efficiency may be improved using the filtered picture as a reference picture in an inter-prediction mode.

The DPB 170 may store the filtered picture in order to use the filtered picture as a reference picture in the inter-prediction unit 180.

The inter-prediction unit 180 performs a temporal prediction and/or a spatial prediction with reference to a reconstructed picture in order to remove temporal redundancy and/or spatial redundancy. In this case, a reference picture used to perform a prediction may include a blocking artifact or a ringing artifact because it is a signal that has been quantized or inverse quantized in a unit of block when the reference picture is previously encoded or decoded.

Accordingly, in order to solve the discontinuity of such a signal or the performance deterioration due to the quantization of the signal, the inter-prediction unit 180 may interpolate a signal between pixels in a unit of sub-pixel using a low-pass filter. In this case, the sub-pixel means a virtual pixel generated by applying an interpolation filter to the sub-pixel, and an integer pixel means an actual pixel present in a reconstructed picture. An interpolation method may include a linear interpolation, a bi-linear interpolation, and a wiener filter.

The interpolation filter may be applied to a reconstructed picture in order to improve the precision of prediction. For example, the inter-prediction unit 180 may generate interpolation pixels by applying the interpolation filter to integer pixels and perform prediction using an interpolated block including the interpolated pixels as a prediction block.

The intra-prediction unit 185 may predict a current block with reference to samples that neighbor a block that is going to be encoded. The intra-prediction unit 185 may perform the following process in order to perform intra-prediction. First, a reference sample required to generate a prediction signal may be prepared. Furthermore, a prediction signal may be generated using the prepared reference sample. Thereafter, a prediction mode is coded. In this case, the reference sample may be prepared through the reference sample padding and/or the reference sample filtering. The reference sample may include a quantization error because it has experienced prediction and reconstruction processes. Accordingly, in order to reduce such an error, a reference sample filtering process may be performed on each prediction mode used in the intra-prediction.

A prediction signal generated through the inter-prediction unit 180 or the intra-prediction unit 185 may be used to generate a reconstructed signal or may be used to generate a residual signal.

Figure 2:
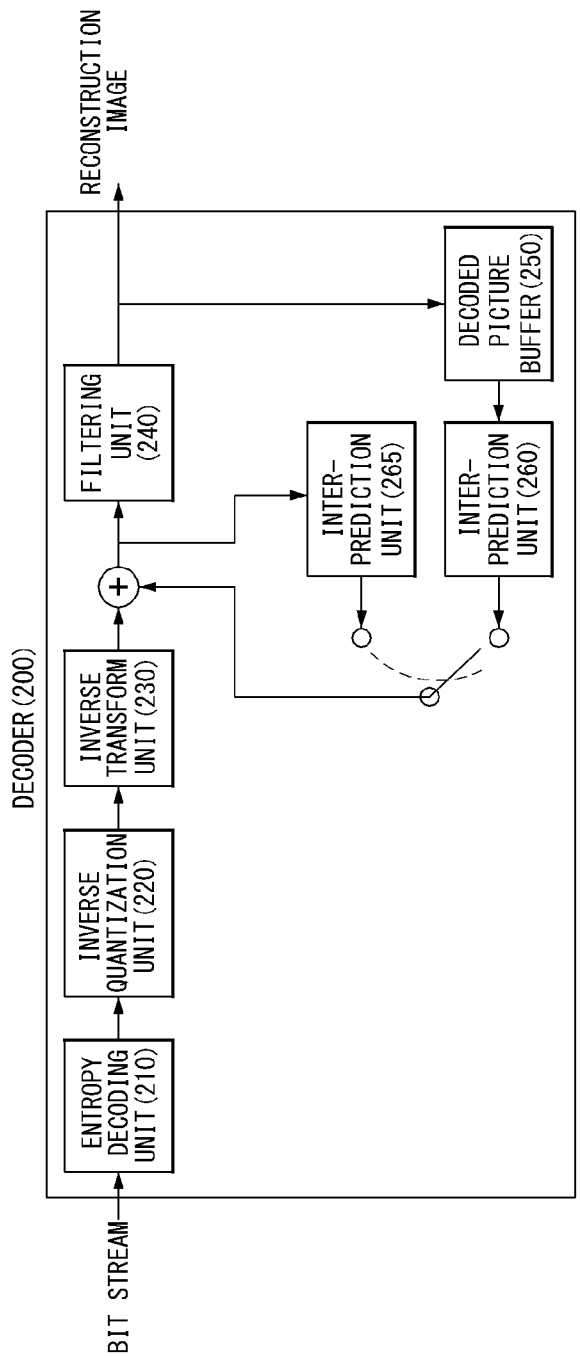
FIG. 2 illustrates a schematic block diagram of a decoder in which a decoding of a video signal is performed in an embodiment to which the present invention is applied.

FIG. 2 illustrates a schematic block diagram of a decoder in which a decoding of a video signal is performed in an embodiment to which the present invention is applied.

Referring to FIG. 2 a decoder 200 may include an entropy decoding unit 210, an inverse quantization unit 220, an inverse transform unit 230, a filtering unit 240, a DPB 250, an inter-prediction unit 260, and an intra-prediction unit 265.

A reconstructed video signal outputted through the decoder 200 may be played on a playback apparatus.

The decoder 200 may receive a signal outputted by the encoder 100 shown FIG. 1. The received signal may be subjected to entropy decoding through the entropy decoding unit 210. In this case, the output signal may include a graph parameter set and prediction vector information. The prediction vector information may be determined based on a linear combination between an eigenvector of the graph Laplacian matrix and a cost function based on a distribution of the eigenvector.

As another example, the prediction vector information may be determined based on an eigenvalue of the graph Laplacian matrix and an optimization function that has an eigenvector as a variable. In this case, the optimization function may be represented as an unconstrained optimization function using a Lagrange multiplier, and the unconstrained optimization function may be represented by a new M-dimensional vector.

The decoder 200 may generate a prediction signal based on the prediction vector information. This process may be performed in the inter-prediction unit 260, but the present invention is not limited thereto.

The inverse quantization unit 220 obtains a transform coefficient from the entropy-decoded signal using information about a quantization step size. The transform coefficient obtained may be that of various embodiments described in the transform unit 120 shown in FIG. 1 above being applied.

The inverse transform unit 230 obtains a residual signal by inversely transforming the transform coefficient.

A reconstructed signal is generated by adding the obtained residual signal to a prediction signal outputted by the inter-prediction unit 260 or the intra-prediction unit 265.

The filtering unit 240 applies filtering to the reconstructed signal and outputs it to a display apparatus or the DPB 250. The filtered signal transmitted to the DPB 250 may be used as a reference picture in the inter-prediction unit 260.

In the present specification, the embodiments described for the filtering unit 160, the inter-prediction unit 180 and the intra-prediction unit 185 of the encoder 100 may be identically applied to the filtering unit 240, the inter-prediction unit 260 and the intra-prediction unit 265 of the decoder, respectively.

Figure 3:
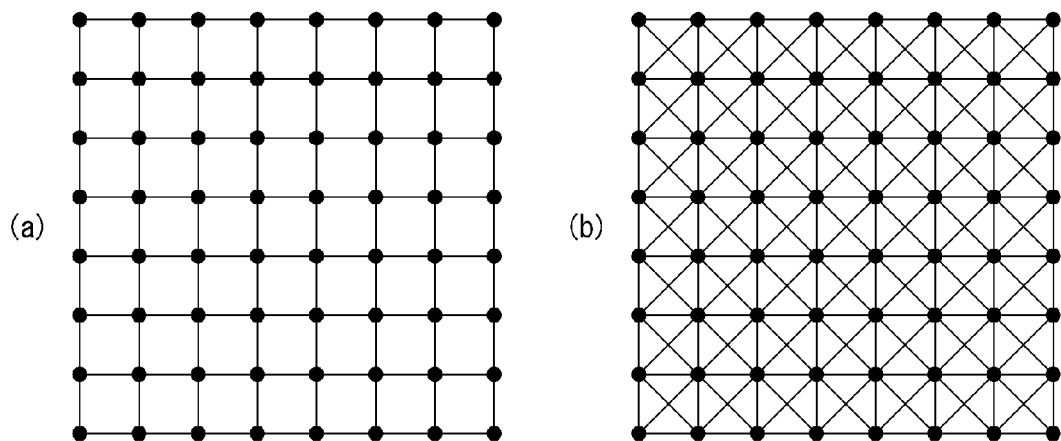
FIG. 3 represents examples of graphs used for modeling statistical relationships in 8×8 block within a video frame in accordance with an embodiment to which the present invention is applied.

FIG. 3 represents examples of graphs used for modeling statistical relationships in 8×8 block within a video frame in accordance with an embodiment to which the present invention is applied.

FIG. 3 shows an example of a graph defined as a square block of an image pixel.

Referring to FIG. 3, the present invention provides two examples of the type of graph that can be used for processing blocks of 8×8 pixels in images or video. Each pixel is associated with a graph vertex, and the pixel value becomes the graph vertex value.

A graph edge may mean a line connecting graph vertexes. The graph edge is used to represent some form of statistical dependence in the signal, with a positive weight representing its strength. For example, each vertex can be connected to every other vertex, and a zero weight is assigned for edges connecting vertexes that are unrelated or weakly related. However, to simplify representation, edges having the zero weight can be completely removed.

In another embodiment of the present invention, the edges connecting the graph vertexes may be preset according to signal characteristics. For instance, vertexes can be arranged on 1-D arrays for audio signals, 2-D arrays for images, and 3-D arrays for video frames. In this case, a time axis can be used as third dimension. For example, in the graph of FIG. 3(a), the graph edges can be defined to connect each vertex to four of its nearest neighbors. However, the graph edges at block boundaries can be defined differently. Furthermore, in the graph of FIG. 3(b), they are connected to the eight nearest neighbors.

Meanwhile, the present invention may be applied to any graph configurations.

The Laplacian matrix of a graph signal G is represented as Equation 1 below.

$$L = D - A \qquad \text{[Equation 1]}$$

Herein, D represents a degree matrix. For example, the degree matrix may mean a diagonal matrix including the information of a degree of each vertex. A represents an adjacency matrix that represents the interconnection (edge) with an adjacent pixel by a weighting value.

The method in which graph G and the matrix are defined will not described in detail in the present specification. In the present specification, it is just assumed that a graph is defined by a few techniques that use the characteristics of the signals defined by a graph type. Accordingly, according to the present invention, when a graph is generated by performing a signal modeling using matrixes D and A, transform kernel U may be generated through an eigen-decomposition procedure as represented by Equation 2 below.

$$L = U \Lambda U^T \qquad \text{[Equation 2]}$$

Herein, Λ represents an eigenvalue of a graph Laplacian matrix, and U represents an eigenvector, which may be graph-based transform matrix. L represents a graph Laplacian matrix.

The columns of graph-based transform matrix U may include eigenvectors of graph Laplacian matrix L. The eigenvalues of graph Laplacian matrix L that corresponds to a diagonal matrix may be represented by Equation 3 below.

$$A = \mathrm{diag}(\lambda) \quad \text{[Equation 3]}$$

Generally, eigenvectors are not defined as a specific shape. However, according to an object of the present invention, since graph Laplacian matrix L is symmetric, all eigenvectors are real values, and at least one of decomposition may be existed. In graph signal G, the graph-based Fourier transform of signal vector g may be defined as Equation 4 below.

$$h = U^T g = Tg \quad \text{[Equation 4]}$$

Herein, h represents a transform vector, $U^T$ represents a transposed matrix of graph-based transform matrix U, and g represents a vector of graph signal G.

Based on a basic definition for a graph signal as described above, embodiments of the present invention will be described in detail below.

Figure 4:
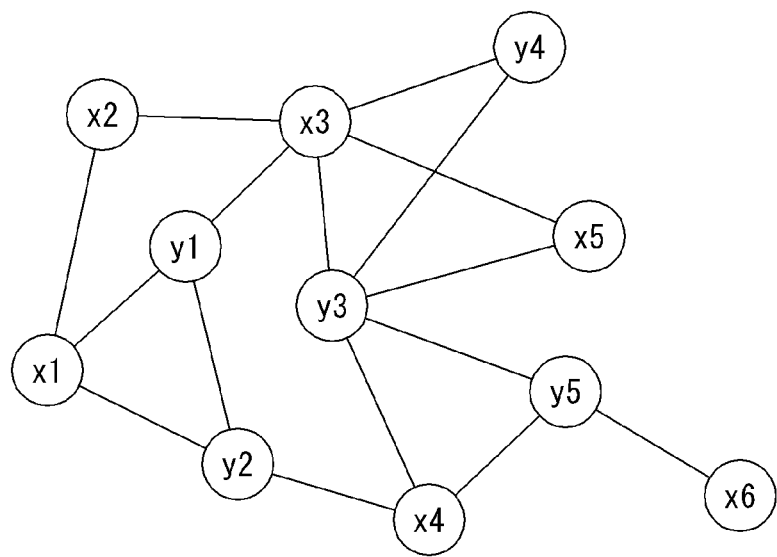
FIG. 4 is an embodiment to which the present invention is applied, and illustrates an arbitrary graph defined by a signal vector for a vertex and an edge weighting value.

FIG. 4 is an embodiment to which the present invention is applied, and illustrates an arbitrary graph defined by a signal vector for a vertex and an edge weighting value.

In an embodiment of the present invention, a method for a signal being defined by arbitrary graph G is provided. For example, a graph signal may be defined by each graph vertex, and may be represented by G-dimensional vector g. The graph characteristics may be defined by non-negative weighting values on each graph edge.

FIG. 4 illustrates an arbitrary graph that has graph characteristics defined by a signal vector defined in the vertexes and a non-negative edge weighting value.

Figure 5:
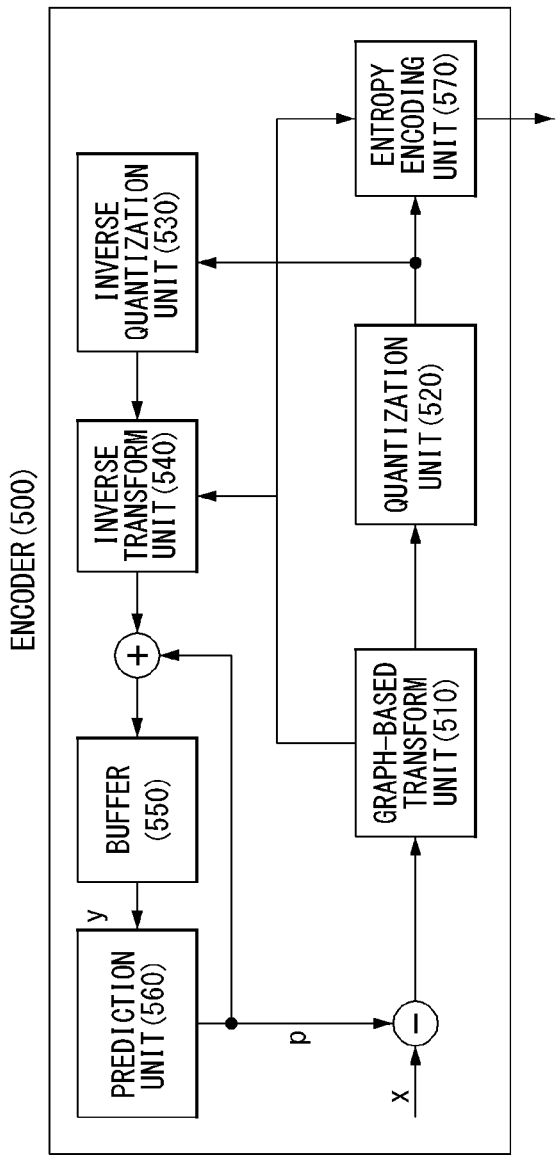
FIG. 5 illustrates a schematic block diagram of an encoder that processes a graph-based signal as an embodiment to which the present invention is applied.

Here, the vertex values may be divided into two sets, and the two sets may mean signal x to be predicted and context signal y. In FIG. 4 above, x1, x2, . . . , x6 represent signals to be predicted, and y1, y2, . . . , y5 represent context signals. For example, as shown in FIG. 5 below, signal x to be predicted may mean an original signal, and context signal y may mean a reconstructed signal according to a loop.

As described with reference to FIG. 4, assuming that the present invention is to predict signal x from context signal y, in the graph model, x and y may form signal g.

According to a vector notation, the present invention may decompose graph signal g as represented in Equation 5.

$$g = \begin{bmatrix} y \\ x \end{bmatrix} \quad \text{[Equation 5]}$$

Herein, g represent a graph signal, x represents a signal to be predicted, and y represents a context signal.

Meanwhile, graph-based transform matrix T may be represented by Equation 6 below.

$$T = [A M] \quad \text{[Equation 6]}$$

Here, T represents a graph-based transform matrix. A and M represent matrixes, respectively.

And, Equation 4 above may be rewritten as Equation 7 below based on Equation 5 and Equation 6 above.

$$h = [A \ M] \begin{bmatrix} y \\ x \end{bmatrix} \quad \text{[Equation 7]}$$

Herein, h has a dimension of G (=M+N).

Meanwhile, since $T^T = T^{-1}$, Equation 7 above may be may be rewritten as Equation 8.

$$\begin{bmatrix} y \\ x \end{bmatrix} = \begin{bmatrix} A^T \\ M^T \end{bmatrix} h \quad \text{[Equation 8]}$$

In this case, the conditions of Equation 9 are satisfied.

$$A^T A = I,$$
$$M^T M = I,$$
$$A^T m = 0 \quad \text{[Equation 9]}$$

Herein, I and 0 represent an identity matrix and a zero matrix of the dimension corresponding to each matrix products.

Based on the definition, an embodiment of the present invention will be described in more detail below.

FIG. 5 illustrates a schematic block diagram of an encoder that processes a graph-based signal as an embodiment to which the present invention is applied.

Referring to FIG. 5, an encoder 500 to which the present invention is applied includes a graph-based transform unit 510, a quantization unit 520, an inverse quantization unit 530, an inverse transform unit 540, a buffer 550, a prediction unit 560 and an entropy encoding unit 570.

The encoder 500 receives a video signal, and generates a prediction error by subtracting a predicted signal outputted from the prediction unit 560 from the video signal. The generated prediction error is transmitted to the graph-based transform unit 510, and the graph-based transform unit 510 applies a transform scheme to the prediction error, thereby generating a transform coefficient. In this case, the graph-based transform unit 510 may calculate a graph-based transform matrix, and may perform a transformation using it. In addition, graph-based transform unit 510 may perform the embodiments described in the present specification.

As another embodiment of the present invention, the graph-based transform unit 510 may obtain an optimized graph-based transform kernel based on an optimization function. In this case, the optimization function may be represented as an unconstrained optimization function using a Lagrange multiplier, and the unconstrained optimization function may be represented by a new M-dimensional vector.

In addition, the graph-based transform unit 510 may obtain a prediction vector using an optimal transform vector calculated through the optimization function, and the prediction vector may be used for generating a prediction signal. In this case, the prediction vector may be obtained based on a linear combination between an eigenvector of the graph Laplacian matrix and a cost function based on a distribution of the eigenvalue.

The obtained prediction vector may be transmitted to the inverse transform unit 540 and may be inverse-transformed, and the inverse-transformed prediction vector may be transmitted to a prediction unit 560 and used for generating a prediction signal. In addition, the prediction vector may be transmitted to the entropy encoding unit 570 and encoded.

The embodiments of the graph-based transform unit 510 may be performed by being included in the transform unit 120 shown in FIG. 1, or may be performed as a separate functional block. And, it is described that the prediction method to which the present invention is applied is also performed in the graph-based transform unit 510, but the present invention is not limited thereto. For example, the prediction method to which the present invention is applied may be performed as a separate functional block or performed by the inter-prediction unit 180/the prediction unit 560.

Hereinafter, the embodiments of the prediction method to which the present invention is applied will be described in more detail.

Graph-Based Prediction

In order to define a Fourier transform of a graph, the present invention may be represented by a degree matrix that corresponds to G (W). Here, the degree matrix is a diagonal matrix including the information of a degree of each vertex, and may be defined as Equation 10 below. For example, the degree may mean the number of a side connected to a vertex.

$$D_{i,j} = \begin{cases} \sum_{k=1}^{V} W_{i,k}, & i = j, \\ 0, & i \neq j \end{cases}, i, j = 1, 2, \ldots, V,$$ [Equation 10]

Graph Laplacian matrix L=D−W, and accordingly, graph Laplacian matrix $L_{i,j}$ is as represented as Equation 11 below.

$$L_{i,j} = \begin{cases} \sum_{k=1}^{V} W_{i,k}, & i = j, \\ -W_{i,j}, & i \neq j \end{cases}, i, j = 1, 2, \ldots, V.$$ [Equation 11]

In this case, when matrix T is the graph Fourier transform, matrix T is as represented as Equation 12 below.

$$T(W) = U^T$$ [Equation 12]

Herein, U represents an eigen matrix that diagonalizes L, and L is as represented as Equation 13 below.

$$L = UAU^{-1} = UAU^T$$ [Equation 13]

And, an orthogonal matrix satisfies Equation 14 below.

$$U^T = U^{-1}$$ [Equation 14]

Based on the definition above, the columns of eigen matrix U includes eigenvectors of L, and eigenvalues of L may be represented as Equation 15 below.

$$A = \text{diag}(\lambda),$$ [Equation 15]

Generally, an eigenvector is not defined as a specific shape. However, according to an object of the present invention, since L is symmetric, it should be considered that all eigenvectors are real values, and at least one of decomposition may be existed. This may be applied to any matrix that satisfies Equation 14.

The prediction of a random signal is a problem of classical statistics. As a general scheme, in the present invention, a vector function may be defined as Equation 16.

$$p: \mathbb{R}^N \to \mathbb{R}^M$$ [Equation 16]

Herein, p(y) represents a predicted value of an M-dimensional random vector when N-dimensional vector y is given.

Assuming that a conditional probability distribution f(x/y) is known, according to the present invention, an optimal prediction function p*(y) may be found through an optimization function represented as Equation 17.

$$p^*(y) = \underset{p(\cdot)}{\text{argmin}} E_{x|y}\{D(x, p(y))\}$$ [Equation 17]

Herein, p*(y) represents an optimal prediction function, x represents an original signal, and p(y) represents a predicted value of an M-dimensional random vector when N-dimensional vector y is given. And, Ex|y{•} represents a conditional expectation operator.

And, Equation 18 represents a function measuring a prediction error.

$$D: \mathbb{R} \times \mathbb{R}^N \to \mathbb{R}$$ [Equation 18]

For example, when D measures a Euclidean distance, the present invention has a minimum squared error problem as represented as Equation 19.

$$p^*(y) = \underset{p(\cdot)}{\text{argmin}} E_{x|y}\{|x - p(y)|^2\}$$ [Equation 19]

Herein, p*(y) represents an optimal prediction function, x represents an original signal, and p(y) represents a predicted value of an M-dimensional random vector when N-dimensional vector y is given.

In this case, an optimal predictor may be as represented as Equation 20 below.

$$p^*(y) = E\{x|y\}$$ [Equation 20]

In the case that a special case such as a linear prediction is applied, the present invention may be represented by Equation 21.

$$p(y) = Py.$$ [Equation 21]

Herein, P represents M×N matrix, and y represents an N-dimensional vector.

An optimal linear predictor matrix for a squared-error measure may be calculated as Equation 22 below.

$$P = E\{xy^T\}(E\{yy^T\})^{-1}$$ [Equation 22]

In addition, in order to describe a prediction algorithm to which the present invention is applied, it is required to further assume a definition of an object function.

$$\Omega: \mathbb{R}^C \times \mathbb{R}^C \to \mathbb{R}.$$ [Equation 23]

In Equation 23, Ω(h,λ) uses a vector of graph Laplacian eigenvalue λ in order to measure how "improbable" is transformation h. Transform vector h that minimizes the function corresponds to more probable signals.

The present invention does not assume an actual theory of a statistical model, but based on an empirical observation that a high frequency component corresponding to the greater eigenvalue has the smaller magnitude, typically.

According to the definition, the present invention provides a method for decomposing the graph-based prediction. That is, in order to predict y from x, graph signal G may be used. This follows the following procedure.

First, edge weighting values of graph signal G may be determined, and graph Laplacian matrix L may be calculated.

Second, in order to determine a vector that has transform matrix T and eigenvalue λ, a spectral decomposition of graph Laplacian matrix L may be performed.

Third, based on the result of the spectral decomposition, an optimal transform vector h*(y) may be obtained as represented by Equation 24.

$$h^*(y) = \underset{A^T h = y}{\operatorname{argmin}}\{\Omega(h, \lambda)\} \quad \text{[Equation 24]}$$

Fourth, based on Equation 25 using Equation 24 above, a prediction vector p(y) may be obtained.

$$p(y) = M^T h^*(y) \quad \text{[Equation 25]}$$

As another embodiment of the present invention, it is also available to predefine a graph weighing value set. Thereby, for all prediction vectors, the first step and the second step in relation to the Laplacian calculation and the transform matrix calculation may not be repeated.

Graph-Based Transform Optimization

In the graph-based prediction algorithm of the present invention, in order to find more efficient solution to the optimization problem of Equation 26 below, several special characteristics may be utilized.

$$\underset{h}{\min}\ \Omega(h, \lambda) \quad \text{[Equation 26]}$$
$$\text{s.t.}\quad A^T h = y$$

Here, $\Omega(h,\lambda)$ represents an objective function for measuring how improbable is transformation h, and $\lambda$ vector represents a graph Laplacian eigenvalue. And, "s.t." is an acronym of "subject to", and represents that it follows a constrained formulation for an optimization function. In the case that $\Omega(h,\lambda)$ is continuous and differentiable, the present invention may use a set of Lagrange multipliers represented by vector s, and may solve the formulation system as defined by Equation 27 below.

$$\nabla_h \Omega(h,\lambda) - As = 0.$$
$$A^T h = y \quad \text{[Equation 27]}$$

However, since matrixes A and M generate orthogonal subspaces, the present invention may define M-dimensional vector z and may obtain Equation 29 using Equation 28 below.

$$h = Ay + Mz \quad \text{[Equation 28]}$$
$$A^T h = A^T A y + A^T M z = y, \quad \text{[Equation 29]}$$

And, by solving the unconstrained optimization problem of Equation 30 below, Equation 31 may be obtained.

$$z^*(y) = \underset{z}{\operatorname{argmin}}\{\Omega(Ay + Mz, \lambda)\} \quad \text{[Equation 30]}$$

$$h^*(y) = Ay + Mz^*(y) \quad \text{[Equation 31]}$$

Through the graph-based transformation optimization procedure, an optimized transform vector may be obtained.

Definition of Quadratic Objective Function

According to the present invention, an objective function as represented by Equation 32 below may be defined as a Quadratic function.

$$\Omega(h,\lambda) = h^T W(\lambda) h \quad \text{[Equation 32]}$$

Herein, W is a semi-positive matrix based on A. For example, W may be briefly defined as represented in Equation 33.

$$W(\lambda) = \operatorname{diag}(\lambda) \quad \text{[Equation 33]}$$

In order to simplify the expression, the present invention considers a dependency of matrix W based on A implicitly, and may analyze the solution of Equation 34 below.

$$\underset{h}{\min}\ h^T W h \quad \text{[Equation 34]}$$
$$\text{s.t.}\quad A^T h = y$$

A Lagrange multiplier may be used for finding an optimal solution. In the case of a quadratic objective function, all of the mathematical expressions defined in Equation 27 above are linear, and the present invention may have a matrix shape as represented in Equation 35 below.

$$\begin{bmatrix} W & -A \\ A^T & 0 \end{bmatrix} \begin{bmatrix} h \\ s \end{bmatrix} = \begin{bmatrix} 0 \\ x \end{bmatrix} \quad \text{[Equation 35]}$$

When W is not a singular form, W may be represented as Equation 36 and Equation 37 below.

$$h = W^{-1} A s. \quad \text{[Equation 36]}$$

$$s = (A^T W^{-1} A)^{-1} y. \quad \text{[Equation 37]}$$

By solving the equation with respect to h, the present invention may obtain Equation 38 below, and a prediction value is as represented in Equation 39.

$$h^* = W^{-1} A (A^T W^{-1} A)^{-1} y \quad \text{[Equation 38]}$$

$$p(y) = M^T h^* = M^T W^{-1} A (A^T W^{-1} A)^{-1} y \quad \text{[Equation 39]}$$

As another embodiment of the present invention, the case that W is singular may be described as below. The version corresponding to Equation 30 for the quadratic objective function is as represented in Equation 40.

$$\underset{z}{\min}\{(y^T A^T + z^T M^T) W (Ay + Mz)\} \quad \text{[Equation 40]}$$

An optimal solution may be defined as Equation 41 and Equation 42 below, and consequently, Equation 43 is obtained.

$$z^* = -(M^T W M)^{-1} M^T W A y \quad \text{[Equation 41]}$$

$$h^* = Ay - M(M^T W M)^{-1} M^T W A y \quad \text{[Equation 42]}$$

$$p(y) = M^T h^* = -(M^T W M)^{-1} M^T W A y \quad \text{[Equation 43]}$$

As another embodiment to which the present invention is applied, another method of selecting an objective function for selecting an optimal transform vector is provided. For example, a quadratic function may be a special case of a convex function as represented in Equation 44 below.

$$\Omega(h, \lambda) = \sum_{k=1}^{G} w_k(\lambda_k) |h_k|^{\alpha_k} \quad \text{[Equation 44]}$$

Herein, $w_k(\lambda_k)$ is a non-zero weighting value, and $\alpha_k \geq 1$ defines a relative increase of penalty for great transformed value. Such parameters may be selected such that coefficients of no probability have small value.

Meanwhile, the quantization unit 520 quantizes the transform coefficient generated through the procedure and transmits the quantized coefficient to the entropy encoding unit 570.

The entropy encoding unit 570 performs entropy coding for the quantized signal and outputs the entropy-coded signal.

The quantized signal outputted from the quantization unit 520 may be used for generating a prediction signal. For example, the inverse quantization unit 530 and the inverse transform unit 540 in a loop of the encoder 500 may perform the inverse quantization and the inverse transformation for the quantized signal such that the quantized signal is reconstructed with the prediction error. The reconstructed signal may be generated by adding the reconstructed prediction error to the prediction signal outputted by the prediction unit 560.

The buffer 550 stores the reconstructed signal for a future reference.

The prediction unit 560 may generate a prediction signal using the signal stored in the buffer 550. In this case, the present invention relates to predict an area within a target image efficiently using an area within an anchor image. Herein, the anchor image may mean a reference image, a reference picture or a reference frame. The efficiency may be determined by evaluating a mean square error that quantifies a rate-distortion cost or a distortion within the prediction error.

The present invention proposes a method for distinguishing a vertex and an edge within a graph and encoding or decoding a residual signal. For example, according to the embodiments of the present invention, various embodiments may be performed through the graph-based transform unit 510. The graph-based transform unit 510 may be included in the encoder 500 or the decoder 700.

Figure 6:
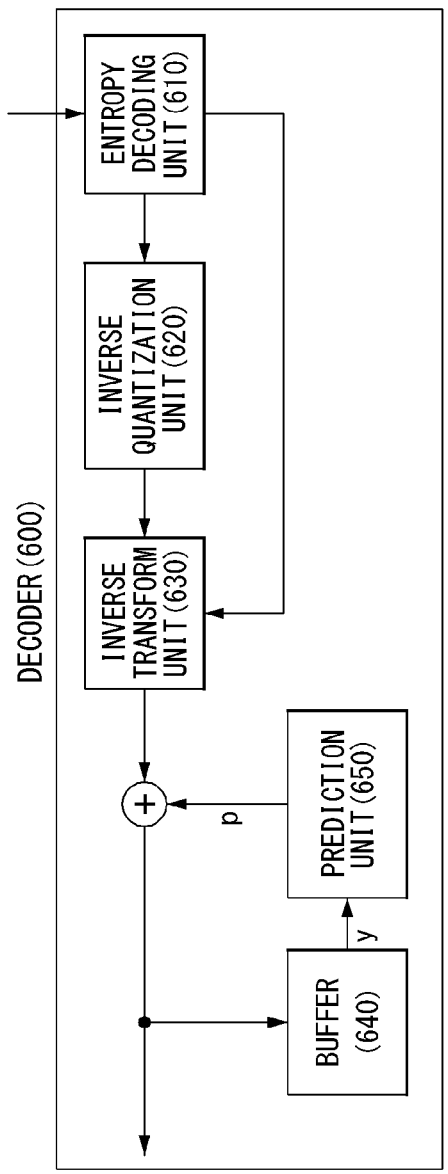
FIG. 6 illustrates a schematic block diagram of a decoder that processes a graph-based signal as an embodiment to which the present invention is applied.

FIG. 6 illustrates a schematic block diagram of a decoder that processes a graph-based signal as an embodiment to which the present invention is applied.

A decoder 600 shown in FIG. 6 receives a signal outputted from the encoder 500. In this case, the output signal may include a graph parameter set and a residual signal. Based on the graph parameter set, a graph-based transformation matrix may be obtained, and the graph-based transformation matrix may include an eigenvector. And, a prediction vector may be obtained using an optimal transform vector, and the optimal transform vector may be calculated through an optimization function. In this case, the prediction vector may be obtained based on a linear combination of the transform vector and eigenvectors, and the transform vector may be determined using a cost function based on a distribution of an eigenvalue of a graph Laplacian function.

Meanwhile, the optimization function may be represented as an unconstrained optimization function using a Lagrange multiplier, and the unconstrained optimization function may be represented by a new M-dimensional vector.

The decoder 600 may generate a prediction signal based on the prediction vector information. This procedure may be performed in a prediction unit 650, but the present invention is not limited thereto.

An entropy decoding unit 610 performs entropy decoding for a received signal. An inverse quantization unit 620 obtains a transformation coefficient from the entropy-decoded signal based on the information of a quantization step size.

An inverse transform unit 630 obtains a prediction error by performing inverse transformation for a transformation coefficient. In this case, the inverse transformation may mean an inverse transformation for the graph-based transformation obtained from the encoder 500.

A reconstructed signal is generated by adding the obtained prediction error to the prediction signal outputted from a prediction unit 650, which is performed in a reconstruction unit (not shown).

A buffer 640 stores the reconstructed signal for a future reference of the prediction unit 650.

The prediction unit 650 generates a prediction signal based on the signal stored in the buffer 640 which is reconstructed previously and the prediction vector to which the present invention is applied.

In the present invention, the graph-based transformation obtained based on a graph parameter may be used in the encoder 500 or the decoder 600.

Figure 7:
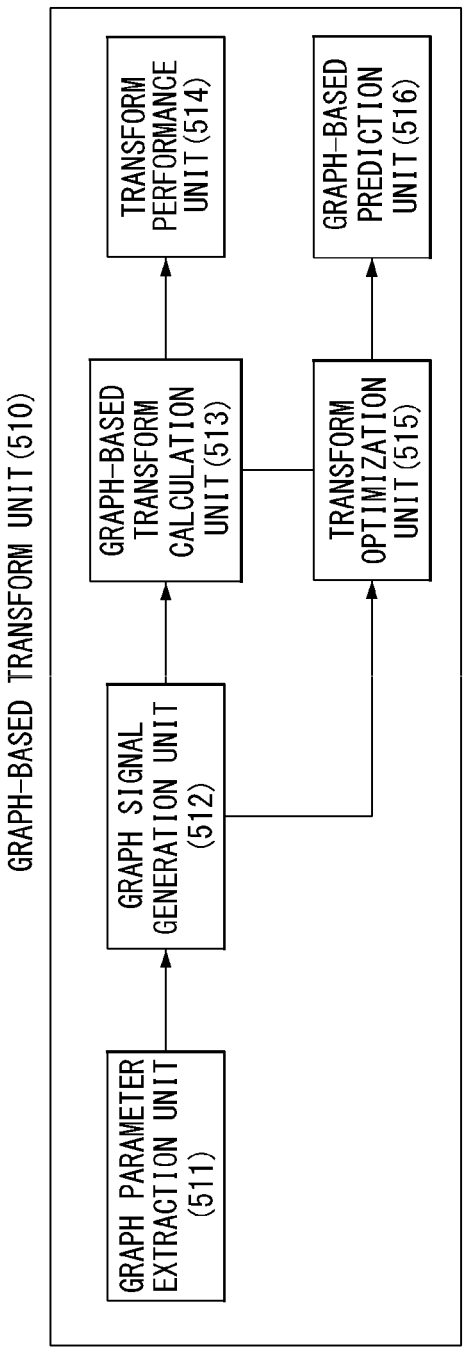
FIG. 7 illustrates an inner block diagram of a graph-based transform unit as an embodiment to which the present invention is applied.

FIG. 7 illustrates an inner block diagram of a graph-based transform unit as an embodiment to which the present invention is applied.

Referring to FIG. 7, the graph-based transform unit 510 may include a graph parameter extraction unit 511, a graph signal generation unit 512, a graph-based transform calculation unit 513, a transform performance unit 514, a transform optimization unit 515 and a graph-based prediction unit 516. However, the present invention is not limited thereto. Each of the functional units in the graph-based transform unit 510 may operate as separate function units, or may operate by being included in other functional unit.

The graph parameter extraction unit 511 may extract a graph parameter within a graph that corresponds to a target unit of a residual signal. For example, the graph parameter may include at least one of a vertex parameter and an edge parameter. The vertex parameter may include at least one of a vertex position and a vertex number, and the edge parameter may include at least one of an edge weighting value and an edge weighting value number. In addition, the graph parameter may be defined as a set of a predetermined number.

The graph signal generation unit 512 may generate a graph signal based on the graph parameter extracted from the graph parameter extraction unit 511. In this case, the graph Laplacian matrix may be calculated from the graph signal.

The graph-based transform calculation unit 513 may obtain a graph-based transform matrix based on the graph parameter or the graph parameter set. In this case, the graph-based transform matrix may include an eigenvector.

In addition, the graph-based transform calculation unit 513 may calculate the graph Laplacian matrix based on the graph parameter or the graph parameter set. In this case, the graph-based transform matrix may be obtained through the spectral decomposition of the graph Laplacian matrix.

The transform performance unit 514 may perform a transformation using the graph-based transform matrix.

The transform optimization unit 515 may calculate an optimal transform vector through an optimization function. Herein, the optimization function may be represented as an unconstrained optimization function using a Lagrange multiplier, and the unconstrained optimization function may be represented by a new M-dimensional vector. For example, Equation 24 or Equation 34 above may be used for the optimization function, and the optimal transform vector may be obtained using Equation 18, Equation 25 or Equation 36 above.

The graph-based prediction unit 516 may obtain a prediction vector using the calculated optimal transform vector. The prediction vector may be obtained based on a linear combination of the transform vector and eigenvectors, and the transform vector may be determined using a cost function based on a distribution of an eigenvalue of the graph Laplacian matrix. For example, the prediction vector may be obtained using Equation 19 or Equation 37 above.

In addition, the prediction vector may be encoded and transmitted to the decoder, or induced from the decoder. As a transmission method, a vector value or a vector difference value may be transmitted, but the present invention is not limited thereto.

Figure 8:
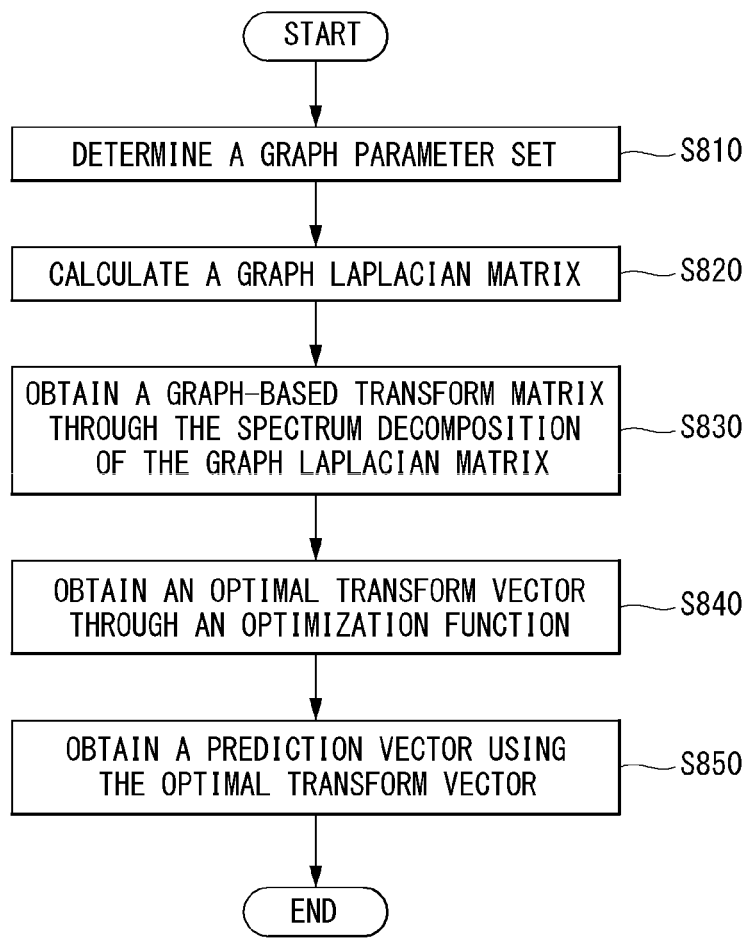
FIG. 8 is a flowchart for describing a procedure of acquiring an optimal prediction vector based on a graph signal as an embodiment to which the present invention is applied.

FIG. 8 is a flowchart for describing a procedure of acquiring an optimal prediction vector based on a graph signal as an embodiment to which the present invention is applied.

An encoder may generate a prediction signal from a received video signal, and may generate a residual signal by subtracting the prediction signal from the video signal. A transformation is performed for the residual signal, and in this case, by applying the graph-based signal processing technique, the graph-based transformation or the graph-based prediction may be performed. Hereinafter, the method for performing the graph-based prediction will be described based on a graph signal.

First, the encoder may determine a graph parameter set that corresponds to a target unit of the video signal (step, S810). For example, at least one of a vertex parameter of graph signal G and an edge weighting value may be determined.

And, the encoder may generate a graph signal based on a graph parameter set, and may calculate a graph Laplacian matrix L based on the graph signal (step, S820).

The encoder may perform the spectral decomposition of the graph Laplacian matrix L in order to determine transform matrix T and a vector that has eigenvalue λ, and may obtain a graph-based transform matrix based on the result of the spectrum decomposition (step, S830). In this case, the graph-based transform matrix may include an eigenvector.

The encoder may obtain an optimal transform vector through an optimization function (step, S840). In this case, Equation 24 or Equation 34 above may be used for the optimization function, and the optimal transform vector may be obtained using Equation 18, Equation 25 and Equation 36 above. Herein, the optimization function may have a context signal, an eigenvalue and an eigenvector of the graph Laplacian matrix as a variable. And, the optimization function may be represented as an unconstrained optimization function based on a Lagrange multiplier, and the unconstrained optimization function may be represented by a new M-dimensional vector.

And, the encoder may calculate a prediction vector using the optimal transform vector (step, S850). Here, the prediction vector may be obtained based on a linear combination of the transform vector and the eigenvectors, and the transform vector may be determined using a cost function based on a distribution of an eigenvalue of the graph Laplacian matrix. For example, Equation 19 or Equation 37 above may be used as the prediction function.

Meanwhile, the calculated prediction vector may be used for generating a prediction signal. Or, as another example, the prediction vector may be encoded and transmitted to a decoder, or induced in the decoder.

Figure 9:
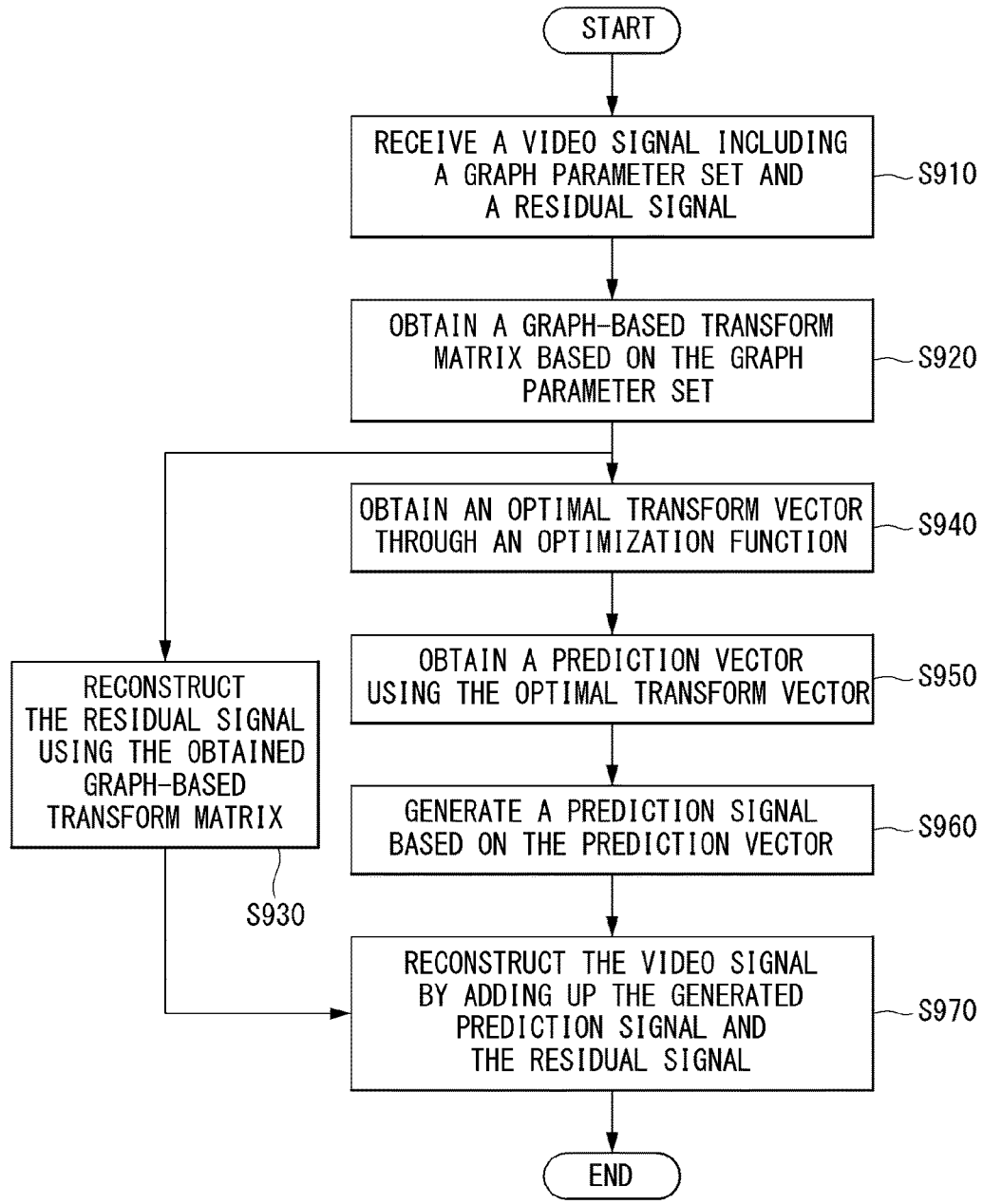
FIG. 9 is a flowchart for describing a procedure of decoding a video signal using the graph-based prediction as an embodiment to which the present invention is applied.

FIG. 9 is a flowchart for describing a procedure of decoding a video signal using the graph-based prediction as an embodiment to which the present invention is applied.

A decoder to which the present invention is applied may receive a video signal including a graph parameter set and a residual signal (step, S910).

And, based on the graph parameter set, a graph-based transform matrix may be obtained (step, S920). Using the obtained graph-based transform matrix, the residual signal may be reconstructed (step, S930).

Meanwhile, the decoder may calculate an optimal transform vector through an optimization function (step, S940). In this case, the optimization function may have a context signal, an eigenvalue and an eigenvector of the graph Laplacian matrix as a variable. And, the optimization function may be represented as an unconstrained optimization function based on a Lagrange multiplier, and the unconstrained optimization function may be represented by a new M-dimensional vector.

The encoder may obtain a prediction vector using the optimal transform vector (step, S950). This procedure may be performed in the prediction unit or the inverse transform unit of the decoder. The prediction vector may be obtained based on a linear combination of the transform vector and the eigenvectors, and the transform vector may be determined using a cost function based on a distribution of an eigenvalue of the graph Laplacian matrix.

And, the decoder may generate a prediction signal based on the prediction vector (step, S960).

The decoder may reconstruct the video signal by adding up the generated prediction signal and the residual signal (step, S970).

As such, the present invention provides an optimized prediction algorithm for performing a graph-based prediction using an optimization function, and accordingly, a prediction value may be obtained with low complexity. Furthermore, the prediction performance may be improved.

As described above, the embodiments explained in the present invention may be implemented and performed on a processor, a micro processor, a controller or a chip. For example, functional units explained in FIGS. 1, 2, 5, 6 and 7 may be implemented and performed on a computer, a processor, a micro processor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for performing a graph-based prediction using a graph parameter set, comprising:
   obtaining the graph parameter set corresponding a target unit of a residual signal, wherein the graph parameter set includes a vertex parameter and an edge parameter, the vertex parameter includes position information and number information of a vertex, and the edge parameter includes a weight value and number information of an edge;
   obtaining a graph-based transform matrix based on the graph parameter set, wherein the graph-based transform matrix includes an eigenvector and is obtained by a spectral decomposition of a graph laplacian matrix L, wherein the graph laplacian matrix L is obtained by an equation $L=D-A$, where D is a degree matrix that represents a diagonal matrix including degree information of each vertex and A is an adjacency matrix that represents interconnection with an adjacent pixel by a weighting value;
   obtaining a prediction vector using an optimal transform vector calculated through an optimization function, wherein the optimization function has a context signal, an eigenvalue of the graph laplacian matrix L and the eigenvector as variables, wherein the context signal means a signal reconstructed according to an encoding loop, and wherein the prediction vector is obtained based on a linear combination of the optimal transform vector and the eigenvector; and
   generating a prediction signal using the prediction vector.

2. The method of claim 1, wherein the optimization function is represented as an unconstrained optimization function based on a Lagrange multiplier, and the unconstrained optimization function is represented by a predetermined M-dimensional vector.

3. A method for decoding a video signal based on a graph-based prediction, comprising:
   receiving the video signal including a graph parameter set and a residual signal, wherein the graph parameter set includes a vertex parameter and an edge parameter, the vertex parameter includes position information and number information of a vertex, and the edge parameter includes a weight value and number information of an edge;
   obtaining a graph-based transform matrix including an eigenvector based on the graph parameter set, wherein the graph-based transform matrix is obtained by a spectral decomposition of a graph laplacian matrix L, wherein the graph laplacian matrix L is obtained by an equation $L=D-A$, where D is a degree matrix that represents a diagonal matrix including degree information of each vertex and A is an adjacency matrix that represents interconnection with an adjacent pixel by a weighting value;
   obtaining a prediction vector using an optimal transform vector calculated through an optimization function, wherein the optimization function has a context signal, an eigenvalue of the graph laplacian matrix L and the eigenvector as variables, wherein the context signal means a signal reconstructed according to a decoding loop, and wherein the prediction vector is obtained based on a linear combination of the optimal transform vector and the eigenvector;
   generating a prediction signal using the prediction vector; and
   reconstructing the video signal by adding up the prediction signal and the residual signal.

4. The method of claim 3, wherein the optimization function is a convex function of the optimal transform vector, and the convex function includes a weighted P-norm of transform vector components.

5. The method of claim 4, wherein the optimization function is represented as an unconstrained optimization function based on a Lagrange multiplier, and the unconstrained optimization function is represented by a predetermined M-dimensional vector.

6. An apparatus for performing a graph-based prediction using a graph parameter set, comprising:
   a processor configured to:
      obtain the graph parameter set corresponding a target unit of a residual signal, wherein the graph parameter set includes a vertex parameter and an edge parameter, the vertex parameter includes position information and number information of a vertex, and the edge parameter includes a weight value and number information of an edge;
      obtain a graph-based transform matrix based on the graph parameter set, wherein the graph-based transform matrix includes an eigenvector and is obtained by a spectral decomposition of a graph laplacian matrix L, wherein the graph laplacian matrix L is obtained by an equation $L=D-A$, where D is a degree matrix that represents a diagonal matrix including degree information of each vertex and A is an adjacency matrix that represents interconnection with an adjacent pixel by a weighting value;
      obtain a prediction vector using an optimal transform vector calculated through an optimization function, wherein the optimization function has a context signal, an eigenvalue of the graph laplacian matrix L and the eigenvector as variables, wherein the context signal means a signal reconstructed according to an encoding loop, and wherein the prediction vector is obtained based on a linear combination of the optimal transform vector and the eigenvector; and
      generate a prediction signal using the prediction vector.

7. The apparatus of claim 6, wherein the optimization function is represented as an unconstrained optimization function based on a Lagrange multiplier, and the unconstrained optimization function is represented by a predetermined M-dimensional vector.

8. An apparatus for decoding a video signal based on a graph-based prediction, comprising:
   a processor configured to:
      receive the video signal including a graph parameter set and a residual signal, wherein the graph parameter set includes a vertex parameter and an edge parameter, the vertex parameter includes position information and number information of a vertex, and the edge parameter includes a weight value and number information of an edge;

obtain a graph-based transform matrix including an eigenvector based on the graph parameter set, wherein the graph-based transform matrix is obtained by a spectral decomposition of a graph laplacian matrix L, wherein the graph laplacian matrix L is obtained by an equation L=D−A, where D is a degree matrix that represents a diagonal matrix including degree information of each vertex and A is an adjacency matrix that represents interconnection with an adjacent pixel by a weighting value;

obtain a prediction vector using an optimal transform vector calculated through an optimization function, wherein the optimization function has a context signal, an eigenvalue of the graph laplacian matrix L and the eigenvector as variables, wherein the context signal means a signal reconstructed according to a decoding loop, and wherein the prediction vector is obtained based on a linear combination of the optimal transform vector and the eigenvector;

generate a prediction signal using the prediction vector; and reconstruct the video signal by adding up the prediction signal and the residual signal.

9. The apparatus of claim 8, wherein the optimization function is a convex function of the optimal transform vector, and the convex function includes a weighted P-norm of transform vector components.

10. The apparatus of claim 9, wherein the optimization function is represented as an unconstrained optimization function based on a Lagrange multiplier, and the unconstrained optimization function is represented by a predetermined M-dimensional vector.

* * * * *